United States Patent
Tajima et al.

[11] Patent Number: 5,334,463
[45] Date of Patent: Aug. 2, 1994

[54] HYBRID FUEL BATTERY SYSTEM AND THE OPERATION METHOD THEREOF

[75] Inventors: Osamu Tajima, Hyogo; Shingo Sumi, Osaka; Koji Shindo, Osaka; Satoshi Yamamoto, Osaka; Fumiiki Yoneda, Osaka, all of Japan

[73] Assignee: Sanyo Electric Co., Ltd., Osaka, Japan

[21] Appl. No.: 967,270

[22] Filed: Oct. 27, 1992

[30] Foreign Application Priority Data

Nov. 29, 1991 [JP] Japan .................. 3-315080

[51] Int. Cl.[5] ......................................... H07M 16/00
[52] U.S. Cl. ........................................... 429/9; 429/13; 429/23; 429/24
[58] Field of Search ................... 429/9, 13, 23, 24, 50

[56] References Cited

U.S. PATENT DOCUMENTS

| | | | |
|---|---|---|---|
| 4,000,003 | 12/1976 | Baker et al. | 429/9 X |
| 4,839,574 | 6/1989 | Takabayashi | 429/23 X |
| 4,883,724 | 11/1989 | Yamamoto | 429/23 |
| 5,139,894 | 8/1992 | Mizuno et al. | 429/9 |

FOREIGN PATENT DOCUMENTS

62-26765 2/1987 Japan .
63-45765 4/1988 Japan .
63-98712 4/1988 Japan .

*Primary Examiner*—Stephen Klafut
*Attorney, Agent, or Firm*—Wegner, Cantor, Mueller & Player

[57] ABSTRACT

A hybrid fuel cell system including a fuel cell for generating electric power by reacting fuel gas and oxidant gas, current restricting structure for restricting an output current of the fuel cell, a storage cell connected parallel to a series circuit comprising the fuel cell and the current restricting structure for helping the fuel cell to supply electric power to an external load, external load fluctuation detecting structure for detecting a fluctuation in the current demanded by the external load and current limitation adjusting structure for following the fluctuation in the current demanded by the external load by changing the restriction of the output current of the fuel cell which is made by the current restricting structure, with the passage of time.

14 Claims, 6 Drawing Sheets

HYBRID FUEL BATTERY SYSTEM AND THE OPERATION METHOD THEREOF

BACKGROUND OF THE INVENTION (1) Field of the Invention

The present invention relates to a hybrid fuel cell system applied to a fuel cell and a general cell, particularly a control device for an output current of the fuel cell, and its operation.

(2) Description of the Related Art

Fuel cells such as a phosphoric acid fuel cell, a molten carbonate fuel cell, and a solid oxide fuel cell, are constructed so that water and electricity are generated from the reaction of hydrogen and oxygen. Hydrogen supplied to such fuel cells is made at a reforming device from fuel such as natural gas, or methanol. Also a utilization factor of the fuel cell is usually controlled to be 80% or less, which contributes to gaining a smooth reaction of the fuel cell. The fuel cell constructed above is connected to an external load to supply electric power to the load. Increasing/decreasing hydrogen supplied to itself, the fuel cell can follow a fluctuation in the value of the external load to supply sufficiency electric power to the external load as long as the fluctuation is gradual. However, when the value of the external load changes suddenly, hydrogen cannot be supplied to the fuel cell as fast as it should be, causing the fuel cell to lack gas. This leads a decrease in an output voltage, making it impossible for the fuel cell to follow the change in the value of the external load to supply sufficient electric power to the external load. Also in such a case, quantity of exhaust gas generated at the fuel cell is so little that the reforming device cannot execute a reforming operation, causing a safety device to be driven to make an urgent stop of the fuel cell.

Responding to the above problem, a general hybrid fuel cell system has been adopted, wherein sufficient electric power is supplied to the external load even when the value of the load changes suddenly. Also this system adopting a storage cell for helping the fuel cell to supply electric power to the external load prevents an overuse of the fuel cell. The system basically consists of a series circuit wherein a DC/DC converter is inserted into an output current line, and the storage cell connected parallel with each other. Further, the fuel cell in the system is constructed to output around a certain amount of electric power at all times, except when the value of the load increases suddenly. When the value of the load increases suddenly, the storage cell equipped parallel to the fuel cell supplies electric power to make up for its shortage. Then, once the value of the load becomes stable, the storage cell stops supplying electric power. In other words, the amount of the output of the storage cell becomes 0, and electric power is exclusively supplied by the fuel cell.

The system is further explained referring to the example of an electric automobile adapting the system. That is, the hybrid fuel cell system applied to the electric automobile adopts the storage cell in addition to the fuel cell to make up for the shortage of electric power which occurs when the automobile accelerates or climbs a hill. On the other hand, only the fuel cell is used when the automobile travels a flat ground at a certain speed. When the system adopts both the storage cell and the fuel cell, the amount of electric power supplied by the fuel cell is controlled to be around a certain level by the DC/DC converter. Also the storage cell is charged with the same or smaller amount of electric power output from the fuel cell.

The general hybrid fuel cell system is, however, effective only when the value of the external load is larger than the output of the fuel cell. That is, for the external load with its value larger than the output of the fuel cell the system is valid since it adopts a follow-up electric power generation manipulating a storage cell to make up for the shortage of electric power. However, for the external load with its value smaller than the output of the fuel cell the use of the system provides the following problem. That is, using the DC/DC converter the output of the fuel cell is set to be around a certain level at all times in the system. Therefore, when the value of the external load is smaller than the output, some electric power (the difference between output of the fuel cell and the external load) needs to be consumed. Generally an internal load such as a heater is equipped inside the system to consume such electric power. This leads to a problem of lowering the energy efficiency since the amount of the electric power generated in the system is larger than the amount of the electric power necessary for the external load.

SUMMARY OF THE INVENTION

Accordingly, this invention has an object to provide a hybrid fuel cell system with its operation method, in which the internal load such as a heater is not necessary even when the value of the external load is smaller than the output of the fuel cell, which improves energy efficiency.

The above object is fulfilled by the hybrid fuel cell system comprising the fuel cell for generating electric power by reacting fuel gas and oxidant gas, a current restricting device for restricting the output current of the fuel cell, the storage cell connected parallel to the series circuit composing the fuel cell and the current restricting device for helping the fuel cell to supply electric power to the external load, an external load fluctuation detecting device for detecting a fluctuation in the value of the external load, and a current limitation adjusting device for following the fluctuation in the value of the external load by changing with the lapse of time limitation of the output current of the fuel cell made by the current restricting device.

According to the above construction, the fluctuation in the value of the external load is detected by the external load fluctuation detecting device, and the current limitation adjusting device changes limitation of the output current of the fuel cell with the lapse of time. For example, when the value of the external load suddenly changes to become smaller than the output of the fuel cell, the fuel cell cannot follow the change immediately. However, the extra output of the fuel cell is used to charge the storage cell. Subsequently, when the current limitation adjusting device starts lowering the output current of the fuel cell gradually, the current supplied from the fuel cell to the external load reduces, which further reduces the charge of the storage cell. Finally the current to the external load is exclusively supplied by the fuel cell. The system of the present invention does not necessarily have the internal load such as a heater while do the general hybrid fuel cell systems wherein limitation current is fixed by the current restricting device. Consequently, no extra electric power in addition to that for the external load is generated in the system even when the value of the external load is smaller than the output of the fuel cell, which improves the energy efficiency. When the value of the external load suddenly changes to become larger than the output of the fuel cell, the fuel cell cannot follow such a change immediately. However, the storage cell discharges to supply necessary electric power to the external load for a while. Subsequently, when the current limitation adjusting device starts increasing the output current of the fuel cell gradually, the current supplied from the fuel cell to the external load increases, and the discharge of the storage cell reduces. Finally, the current to the external load is exclusively supplied by the fuel cell. As is described thereinbefore, cooperating with the storage cell the system of the present invention can follow any change in the value of the external load.

The current restricting device may be the DC/DC converter including a gate terminal, the gate terminal having a control signal from the current limitation adjusting device.

The system may further include a voltage limitation adjusting device for changing limitation of an output voltage of the DC/DC converter by monitoring a charge current of the storage cell.

The control signal from the voltage limitation adjusting device may be given to the gate terminal of the DC/DC converter.

The external load fluctuation detecting device may comprise a first current detecting device inserted into the output current line of the fuel cell, a second current detecting device inserted into a charge/discharge current line of the storage cell, an adding device for adding the values detected by the first and the second current detecting devices, and a detecting device for detecting a change occurring with the lapse of time in the result of adding by the adding device.

When the value of the external load fluctuates, the current limitation adjusting device may change its limitation at a speed which enables the fuel cell to follow the fluctuation.

A control current $I_{FR}$ of the current limitation adjusting device may change according to the following formula, in which $I_{FR}'$ refers to the $I_{FR}$ in an immediate past and $I_L Dt$ refers to a time integration value of an external load current.

$$I_{FR} = I_{FR}' + \int I_L Dt$$

The voltage limitation adjusting device may operate to make the fuel cell charge the storage cell when the current limitation adjusting device makes the fuel cell supply the entire current to the external load.

The system may further include a storage cell temperature detecting device, wherein the voltage limitation adjusting device corrects the output voltage of the DC/DC converter according to a temperature of the storage cell detected by the storage cell temperature detecting device.

According to the above construction an overcharge of the storage cell is automatically prevented.

The voltage limitation adjusting device may operate the following corrections, in which T refers to the detected temperature of the storage cell, $T_1$ a first fixed temperature, and $T_2$ a second fixed temperature ($T_2 > T_1$):

in the case of $T < T_1$, a first voltage value is generated;

in the case of $T = T_2$, a second voltage value, which is smaller than the first one, is generated; and in the case of $T_1 < T < T_2$, the output voltage of the DC/DC converter gradually decreases.

The gate terminal of the DC/DC converter may select the more active one of the control signals of the current limitation adjusting device and of the voltage limitation adjusting device.

A channel for supplying fuel gas to the fuel cell may be equipped both with the reforming device for reforming fuel gas into gas enriched with hydrogen and with a fuel supply valve for controlling quantity of fuel gas supplied to the reforming device, and an opening of the valve is set responding to the output current value of the fuel cell.

The system may further comprise a reforming device temperature detector for detecting a temperature of a catalytic layer of the reforming device, and a fuel supply valve opening correcting device for correcting the opening of the fuel supply valve responding to the result detected by the reforming device temperature detector, such as correcting the valve in the direction of opening when the temperature of the catalytic layer is higher than a standard temperature, correcting in the direction of closing when the temperature of the catalytic layer is lower than the standard temperature, and holding the valve with a fixed opening when the temperature of the catalytic layer is the same as the standard temperature.

According to the above construction, the fuel cell is operated at the fixed utilization factor at all times.

An operation method of the hybrid fuel cell system, the hybrid fuel cell system constructed to supply electric power to the external load including a series circuit of the fuel cell and the current restricting device for restricting the output current of the fuel cell in which the storage cell is inserted thereinto, may comprise the steps of detecting the fluctuation in the value of the external load and changing limitation of the output current of the fuel cell determined by the current restricting device with the lapse of time when the value of the external load fluctuates.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings.

DESCRIPTION OF THE PREFERRED EMBODIMENT

Figure 1:
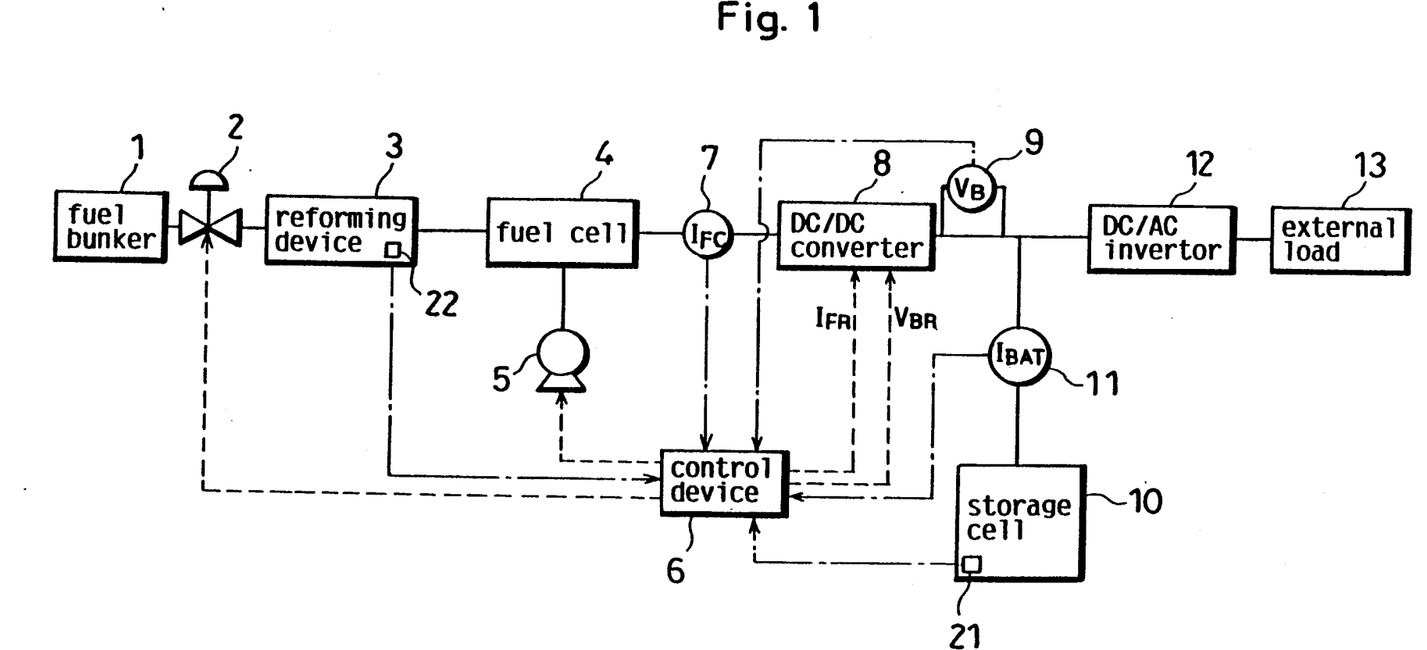
FIG. 1 is an illustration showing the construction of the hybrid fuel cell system of the present invention.

In FIG. 1 the solid line from a fuel bunker 1 to a fuel cell 4 shows the channel for fuel gas. The fuel from the fuel bunker 1 is supplied to a reforming device 3 through a fuel supply valve 2, wherein fuel gas is reformed into gas enriched with hydrogen. Then the reformed gas is supplied to the fuel cell 4. The fuel cell 4 such as a phosphoric acid fuel cell generates electric power by reacting air supplied from an air supply fan 5 and hydrogen, reformed at the reforming device 3. Generally, the utilization factor of the fuel cell is 80%, and the opening of the fuel supply valve 2 is controlled by a control device 6 to retain this utilization factor. Exhaust gas generated at the fuel cell 4 operated at such utilization factor is refluxed to the reforming device 3 through an unillustrated pipe, and is burnt again.

The solid line from the fuel cell 4 to an external load 13 shows the current line, and a DC/DC converter 8 is inserted into the output current line of the fuel cell 4 as an example of current restricting device. A storage cell 10 is connected parallel to the series circuit composing the fuel cell 4 and the DC/DC converter 8, and the external load 13 is connected to the parallel circuit via a DC/AC invertor 12. Needless to say, when the external load 13 is driven by a direct current, the DC/AC invertor 12 equipped to drive the external load 13 by an alternating current is not necessary.

Although not illustrated, the DC/DC converter 8 is a general circuit comprising a direct current chopper, a transformer, and a rectification circuit. The control signals given to the gate terminal of the direct current chopper can change upper limitation values such as the upper limitation of the output current of the fuel cell 4 or the upper limitation of the output voltage of the DC/DC converter 8.

An amperemeter 7 is equipped at the output current line of the fuel cell 4 as is an amperemeter 11 equipped at the charge/discharge current line of the storage cell, both of which detect each current as a current detecting device. The signals detected at the amperemeters 7, 11 are input to the control device 6, and the corrected current value of $1_{FR}$ gained from the computation described later is given to the gate terminal of the DC/DC converter 8, thereby making it possible to adjust the current limitation of the DC/DC converter.

Further, a voltmeter 9 is provided to the output circuit of the DC/DC converter 8 to detect the output voltage, and a temperature sensor 21 is equipped at the storage cell 10 to detect a temperature T. The signals detected at the above equipment are put into the control unit 6, and a corrected voltage value of $V_{BR}$ gained from the computation described later is given to the gate terminal of the DC/DC converter 8, thereby making it possible to adjust the output voltage limitation of the DC/DC converter.

Input signals such as a catalytic layer temperature detecting signal from a temperature sensor 22 at the reforming device 3, and output signals such as an opening control signal for the fuel supply valve 2 and a rotation speed control signal for the air supply fan 5, in addition to the signals above, are also put into the control device 6.

Figure 2:
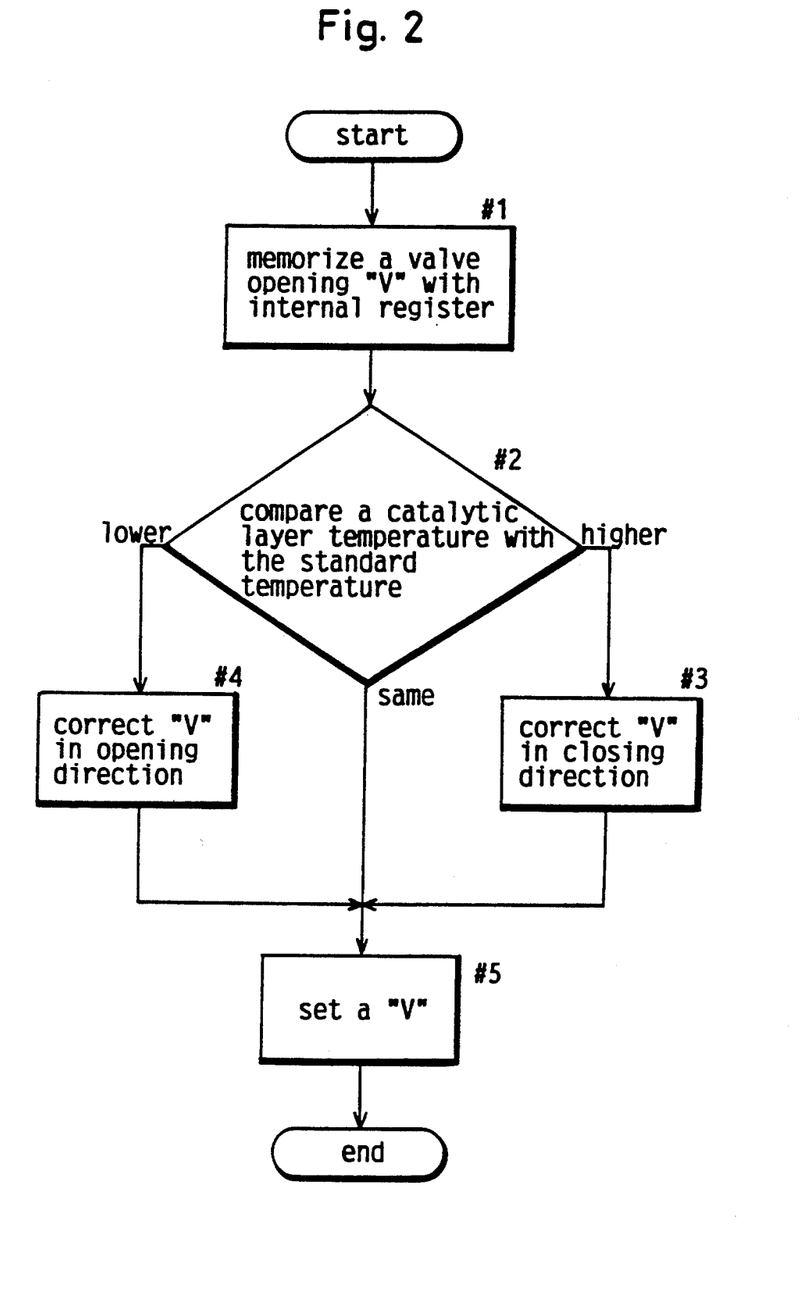
FIG. 2 is a flow chart depicting the opening control of the fuel supply valve.

Next, control of the valve opening conducted at the control device 6 is described in FIG. 2. At #1 the internal register memorizes a valve opening V gained in accordance with the value of an output current $I_{FC}$ of the fuel cell 4. Then, at #2 the catalytic layer temperature of the reforming device 3 is compared with the standard temperature, and the valve opening value memorized with the internal register is slightly corrected in the direction of closing when the catalytic layer temperature is higher (#3). On the contrary, the valve opening value memorized with the internal register is slightly corrected in the direction of opening when the catalytic layer temperature is lower than the standard temperature (#4). When these two temperatures are the same, no correction above is made.

Now, the value memorized with the internal register is loaded to control the opening of the fuel supply valve 2 (#5), thereby driving the fuel cell 4 at a certain utilization factor at all times.

Figure 3:
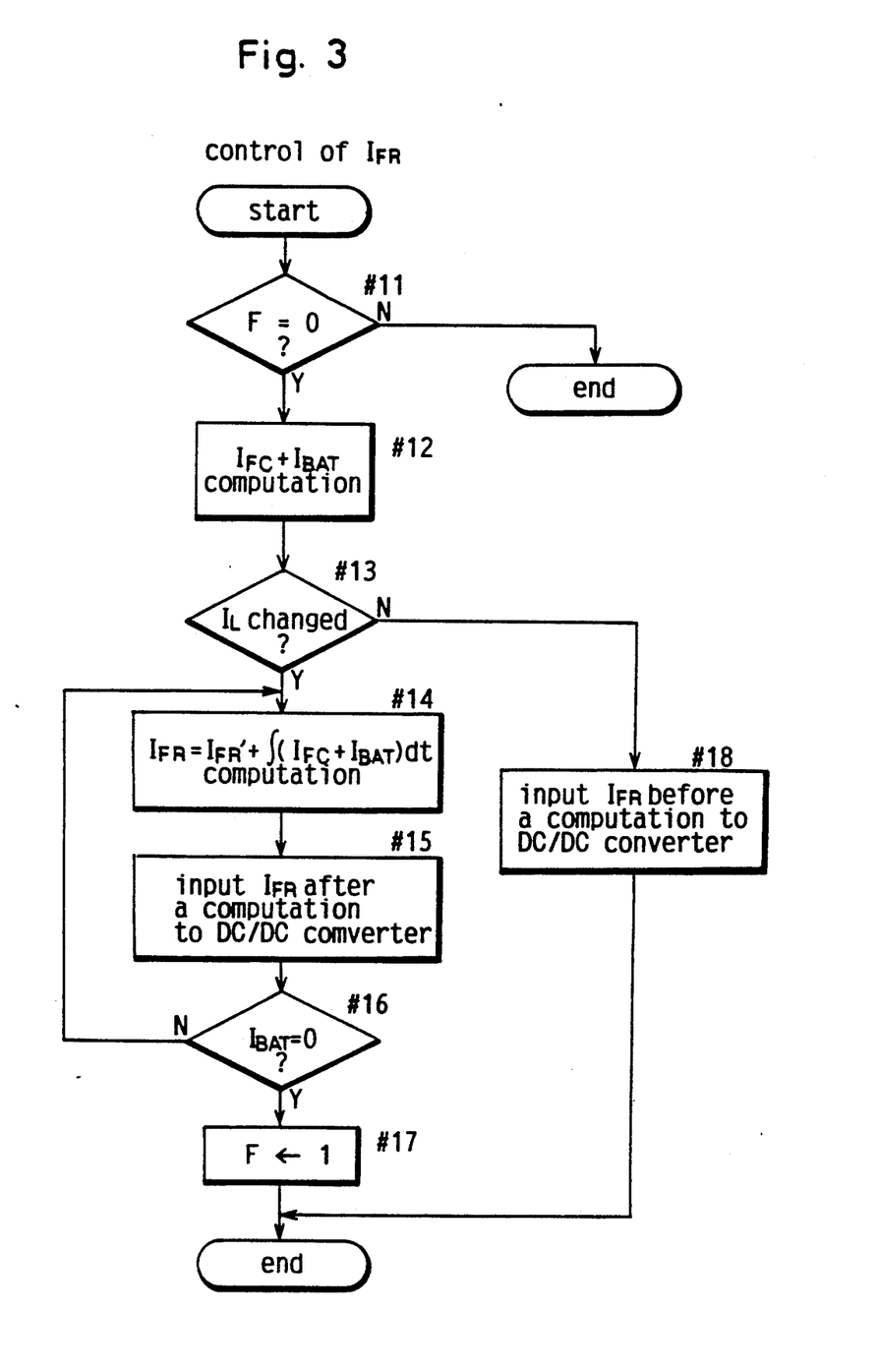
FIG. 3 is a flow chart depicting the process of generating a corrected current value of the DC/DC converter.

Control of output current of the DC/DC converter is described in FIG. 3. A flag F at #11 judges whether the charge or the discharge of the storage cell is operated. The value of the flag F is changed into either 0 or 1 later at the steps of #17 in FIG. 3 and #21 in FIG. 4.

When the value of the flag F is 0, the operation depicted in FIG. 3 can be executed. At #12 the value of a load current $I_L$ is computed from the output current $I_{FC}$ of the fuel cell 4 and a charge/discharge current $I_{BAT}$ of the storage cell 10. The value of the $I_{BAT}$ is positive when charge of the storage cell 10 is operated, while it is negative when discharge of the storage cell is operated. However, discharge operation depicted in FIG. 3 is practicable only when the flag F is 0 so that the value of the $I_{BAT}$ here is positive. The load current $I_L$ is the sum of the $I_{FC}$ and the $I_{BAT}$.

Next, at #13 it is judged whether the load current $I_L$ has changed or not. When the $I_L$ is judged to have changed, the value of the $I_{FR}$ is computed in the following formula (#14), and then the $I_{FR}$ gained in the computation is given to the DC/DC converter 8 as a newly corrected value (#15).

$$I_{FR} = I_{FR}' + \int (I_{FC} + I_{BAT}) dt \ldots \quad (1)$$

($I_{FR}'$ shows $I_{FR}$ before the execution of the computation in the above formula)

The formula (1) is the correction formula which is known as a first-order lag correction formula, and the $I_{FR}$ increases its value by just an integration value in the second term of the right side of the formula (1) with the lapse of time. Thus, a gradual increase in the $I_{FR}$ causes another increase in the current limitation of a limiter equipped at the DC/DC converter 8. According to this, the output current $I_{FC}$ of the fuel cell 4 increases so that the output of the fuel cell 4 will become sufficient for the whole external load. Until the output of the fuel cell becomes sufficient for the external load, discharge of the storage cell 10 supplies electric power to the external load. At #16 the discharge current $I_{BAT}$ of the storage cell 10 is monitored and the computation of the formula (1) is executed until the $I_{BAT}$ value becomes 0

Figure 5:
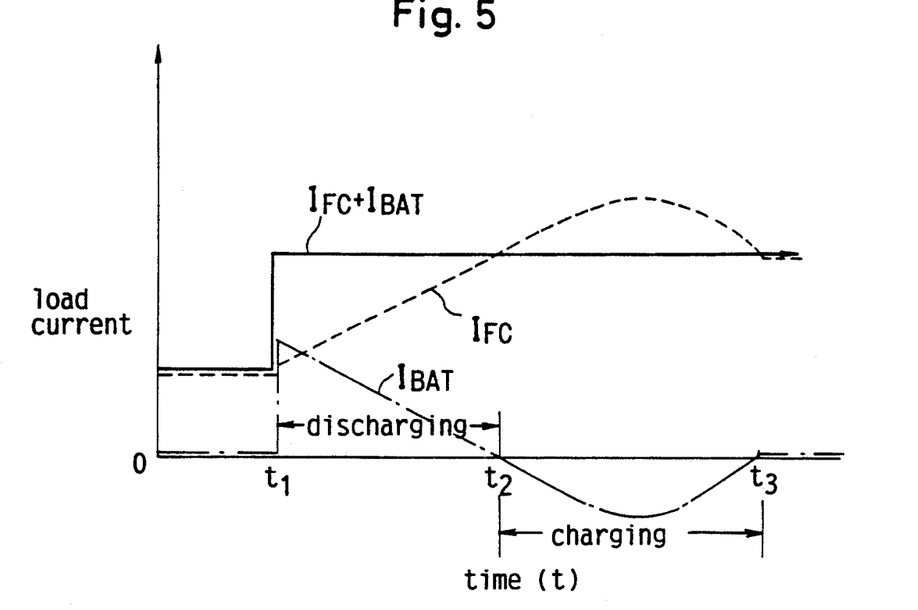
FIG. 5 is an illustration showing changes in the output current of the fuel cell and the charge/discharge current of the storage cell, both of which occur responding to a sudden change in the value of the external load (the value of the external load > the output current of the fuel cell)

(#16→#14→#15). When the discharge current $I_{BAT}$ of the storage cell 10 becomes 0, the flag F is set to be 1 (#17), and the entire operation ends. On the other hand, at #13 when the load current $I_L$ is judged to have not changed, the value of the $I_{FR}$ does not change and the value of the $I_{FR}$ before the computation is given to the DC/DC converter 8 (#18). FIG. 5 shows changes both in the output current $I_{FC}$ of the fuel cell 4 and in the charge/discharge current $I_{BAT}$ of the storage cell 10 occurring in accordance with a sudden change in the value of the external load (the value of the external load > the output current of a fuel cell). It is inferred that the flow chart of FIG. 3 shows the control operated by the time $t_2$ in FIG. 5.

Figure 4:
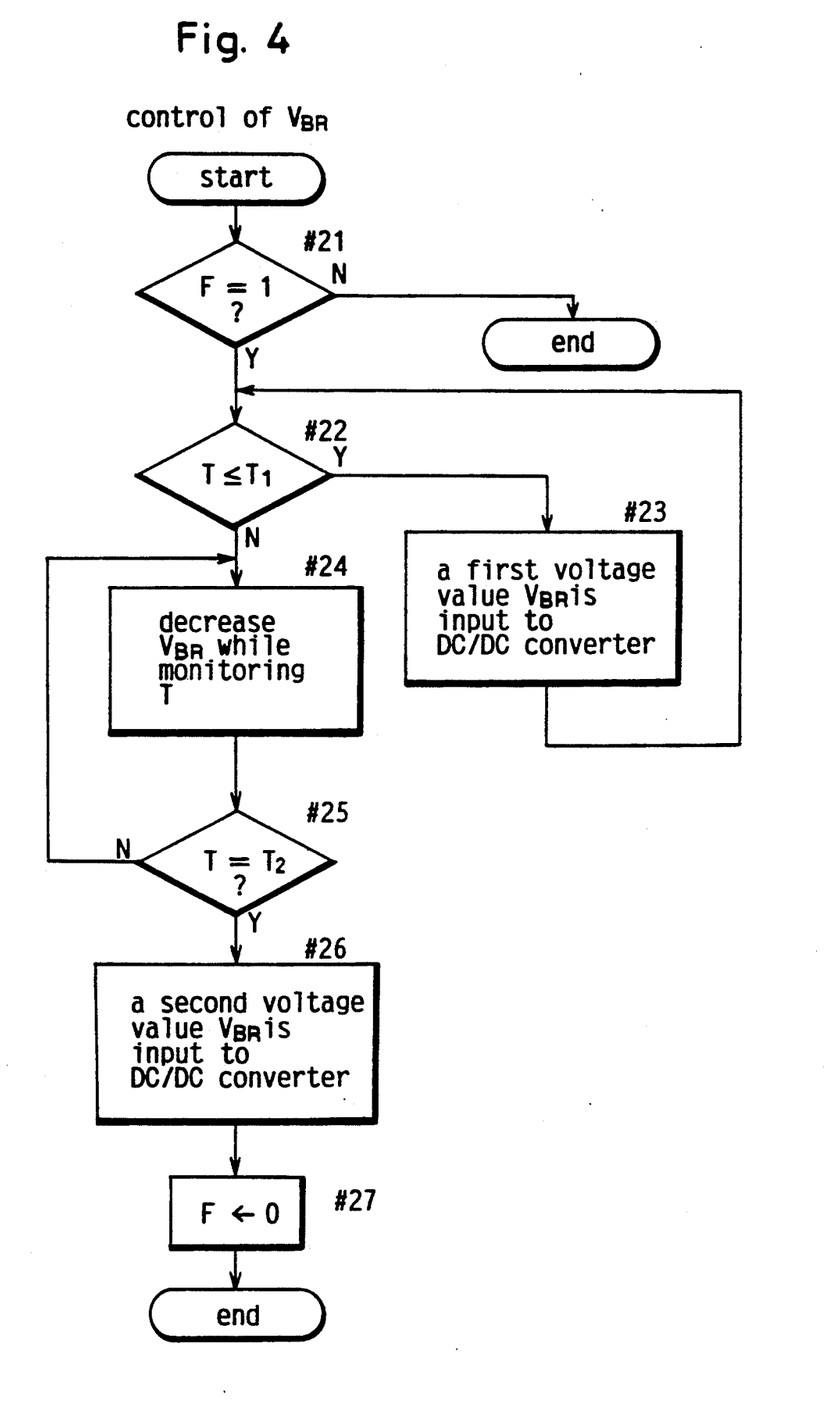
FIG. 4 is a flow chart depicting the process of generating a corrected voltage value of the DC/DC converter.

At #21 of FIG. 4 if the value of the flag F is confirmed to be 1, the temperature T of the storage cell detected by the temperature sensor 21 is judged whether or not it is the same as/lower than a pre-determined temperature $T_1$ (#22). In the case of $T \leq T_1$, the corrected voltage value $V_{BR}$ is set to be the first voltage value (#23). The first voltage value satisfies the condition; an output voltage $V_B$ of the DC/DC converter 8 is higher than an open voltage of the storage cell 10 so that the fuel cell 4 supplies the whole current to the external load 13 and also it supplies the charge current to the storage cell 10. Once the $V_{BR}$ is set so, the storage cell starts charging. As the charging proceeds, the temperature T of the storage cell 10 rises. When the temperature T rises to be higher than the pre-determined temperature $T_1$, the operation of #24 starts. At #24 the corrected voltage value $V_{BR}$ lowers in an inverse proportion to the temperature T rising, while the temperature T of the storage cell 10 being monitored. This operation continues until the temperature T of the storage cell 10 reaches a temperature $T_2$. The temperature $T_2$ is the upper limitation of the temperature which enables the storage cell to charge. When $T = T_2$ is obtained (#25), a second voltage value is generated as $V_{BR}$, which is put into the DC/DC converter 8 (#26). The second voltage value $V_{BR}$ is determined to equalize an output voltage $V_B$ of the DC/DC converter 8 to an open voltage of the storage cell 10 under the condition; the fuel cell supplies the whole current to the external load. Consequently, once the $V_{BR}$ is determined as the second voltage value, the charge current is not supplied to the storage cell 10 any longer. Nor is the discharge current without any doubt. The flag F is reset when all the above operation are completed (#27). The charging operation executed after $t_2$ in FIG. 5 is depicted in the above flow chart, FIG. 4.

Once the flag F is reset at #27 the operation depicted in FIG. 3 is practicable, and the operation starts when the value in the external load suddenly changes. Thus, the operation depicted in FIG. 4 is practicable when the whole operation depicted in FIG. 3 is completed. Also, although both the $I_{FR}$ gained from the operation of FIG. 3 and the $V_{BR}$ gained from the operation of FIG. 4 are simultaneously sent to the gate terminal of the DC/DC converter 8, the gate terminal is constructed to select more active one ($I_{FR}$, $V_{BR}$). Consequently, the $I_{FR}$ is selected during the operation of FIG. 3 and the $V_{BR}$ is selected during the operation of FIG. 4.

Figure 6:
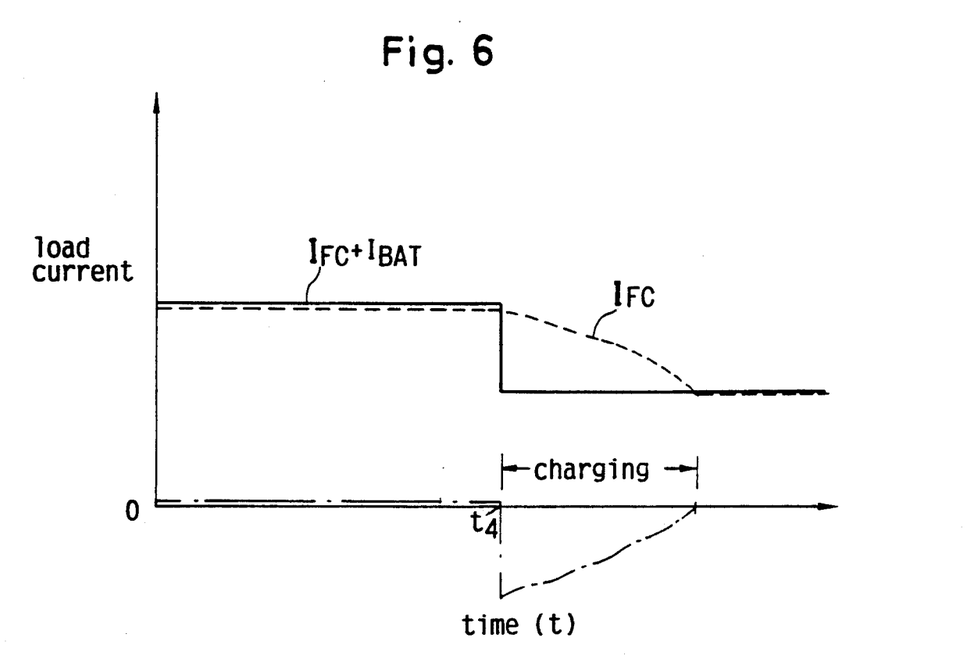
FIG. 6 is an illustration showing changes in the output current of the fuel cell and the charge/discharge current of the storage cell, both of which occur responding to a sudden change in the value of the external load (the value of the external load < the output electric current from the fuel cell)

Control of $I_{FC}$ and $I_{BAT}$ shown in FIG. 3 and FIG. 4 are performed appropriately when the load current increases as well as when the load current decreases. FIG. 6 indicates the change occurring with the lapse of time in the value of $I_{FC}$ and $I_{BAT}$ as the result of control by the control unit 6 when the external load current starts decreasing at time $t_4$.

Figure 7:
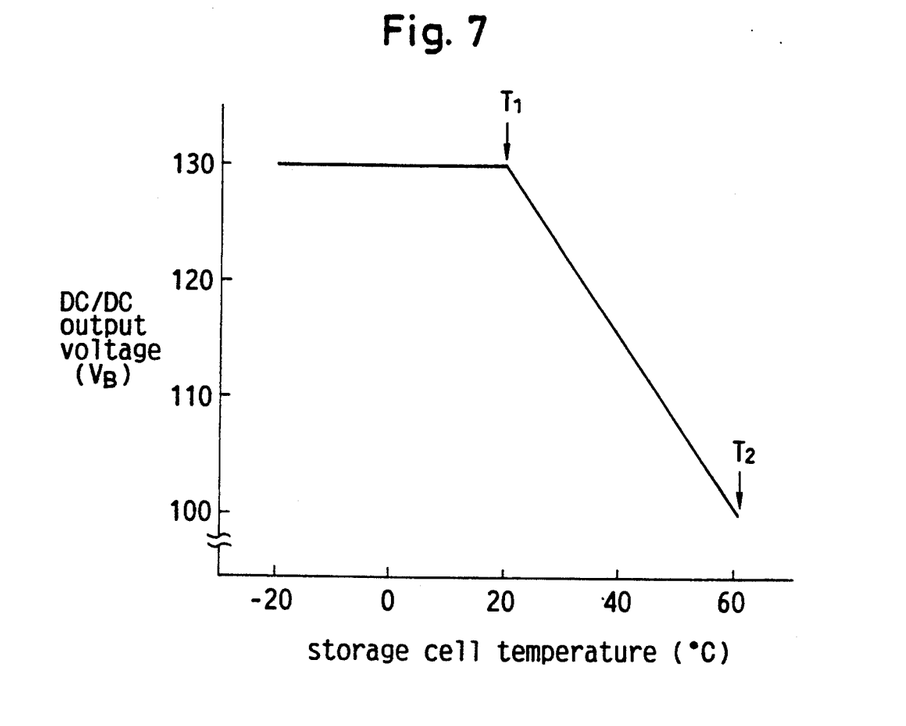
FIG. 7 is an illustration showing the change in the output voltage of the DC/DC converter, which is made under the operation depicted in FIG. 4 responding to a temperature of the storage cell.

FIG. 7 indicates how the output voltage of the DC/DC converter 8 changes responding to the temperature T of the storage cell 10 during the operation shown in FIG. 4. FIG. 7 is an example where the $T_1$ is 20° C. and the $T_2$ is 60° C. Also in the example, the output voltage $V_B$ of the DC/DC converter 8 is 130 V when the $V_{BR}$ is the first voltage value, and 100 V when the $V_{BR}$ is the second voltage value.

As is described hereinbefore, the temperature restricts the charge of the storage cell 10 so that the overcharge is prevented automatically. The temperature detected by the temperature sensor 21 is not necessarily monitored when the charge is simply operated to follow a discharge and the overcharge of the storage cell 10 does not need to be prevented.

Figure 8:
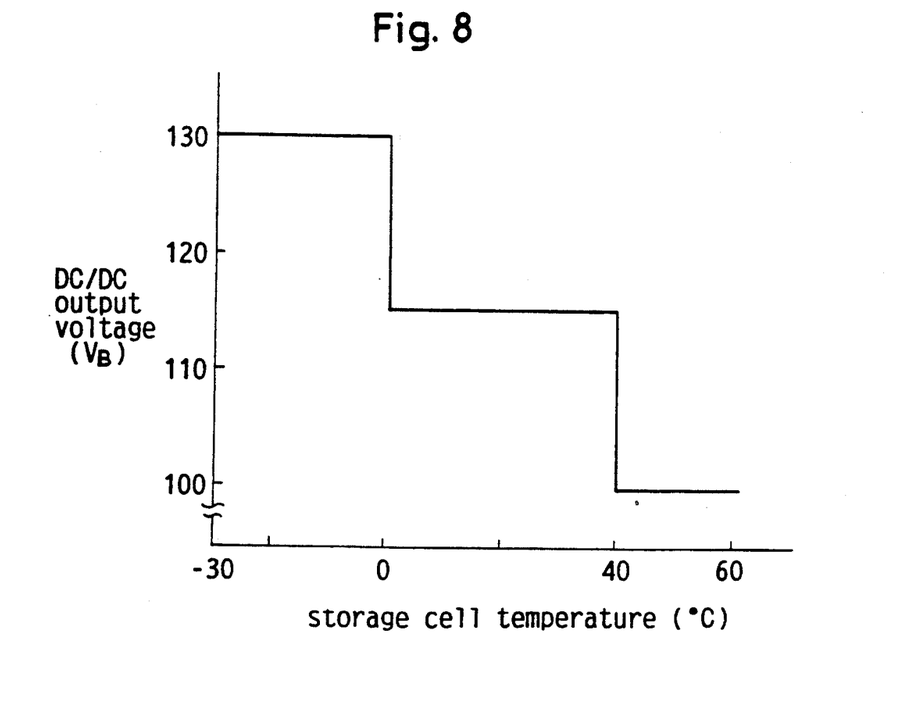
FIG. 8 is an illustration showing the change in the output voltage of the DC/DC converter, which is made under the operation depicted in FIG. 4 responding to a temperature of the storage cell.

FIG. 7 is just an example of changes of the output voltage $V_B$ of the DC/DC converter 8 responding to the temperature detected by the temperature sensor 21 and another example is shown in FIG. 8.

In the embodiment limitation of the limiter of the DC/DC converter 8 changes from one to the other following the first-order lag correction formula. However, needless to say, other optional corrections can be utilized since the embodiment is just one example that describes the change in the output current followed by the fuel cell. As other examples the $I_{FR}$ increases with referring to a step-formed line, or the $I_{FR}$ is computed in a program embedded in the control device 6. The program is produced to direct how the $I_{FR}$ changes responding to essential input information such as a utilization factor of the fuel cell at each moment, characteristics of a change in quantity of hydrogen supplied to the fuel cell, quantity of a change in the external load, and discharge capacity of the storage cell 10.

Further, in the embodiment the output current $I_{FC}$ of the fuel cell and the charge/discharge current $I_{BAT}$ of the storage cell are detected, and the load current is computed therefrom. Finally, the corrected current value $I_{FR}$ of the DC/DC converter 8 is obtained. However, the $I_{FR}$ can also be obtained from the load current $I_L$ and one of the above two currents.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be constructed as being included therein.

What is claimed is:
1. A hybrid fuel cell system comprising:
a fuel cell for generating electric power by reacting fuel gas and oxidant gas;
current restricting means for restricting an output current of said fuel cell;
a storage cell connected parallel to a series circuit comprising said fuel cell and said current restricting means for helping the fuel cell to supply electric power to an external load;
external load fluctuation detecting means for detecting a fluctuation in the current demanded by the external load; and
current limitation adjusting means for following the fluctuation in the current demanded by the external load by changing the restriction of the output cur- rent of the fuel cell which is made by said current restricting means, with the passage of time.

2. The hybrid fuel cell system of claim 1 wherein said current restricting means is a DC/DC converter comprising a gate terminal, said gate terminal having a control signal from said current limitation adjusting means.

3. The hybrid fuel cell system of claim 2 further comprising voltage limitation adjusting means for changing a limitation of the output voltage of the DC/DC converter by monitoring a charge current of said storage cell.

4. The hybrid fuel cell system of claim 3 wherein a control signal from the voltage limitation adjusting means is given to the gate terminal of the DC/DC converter.

5. The hybrid fuel cell system of claim 4 wherein said external load fluctuation detecting means comprise first current detecting means inserted into the output current line of the fuel cell, second current detecting means inserted into a charge/discharge current line of the storage cell, adding means for adding the values detected by the first and second current detecting means and detecting means for detecting a change occurring with the passage of time in a result of adding by the adding means.

6. The hybrid fuel cell system of claim 5 wherein when the current demanded by the external load fluctuates, said current limitation adjusting means changes a limitation at a speed which enables the fuel cell to follow the fluctuation.

7. The hybrid fuel cell system of claim 6 wherein a control current $I_{FR}$ of said current limitation adjusting means changes according to a formula in which $I_{FR}'$ refers to an immediate past $I_{FR}$, $I_L Dt$ refers to a time integration value of an external load current IL and $$I_{FR} = I_{FR}' + \int I_L dt.$$

8. The hybrid fuel cell system of claim 7 wherein said voltage limitation adjusting means operates to make the fuel cell charge the storage cell when the current limitation adjusting means make the fuel cell supply the entire current to the external load.

9. The hybrid fuel cell system of claim 8 further comprising a storage cell temperature detecting means, wherein said voltage limitation adjusting means corrects the output voltage of the DC/DC converter according to a temperature of the storage cell detected by the storage cell temperature detecting means.

10. The hybrid fuel cell system of claim 9 wherein said voltage limitation adjusting means operates the following corrections, in which T refers to a detected temperature of the storage cell, $T_1$ a first fixed temperature, and $T_2$ a second fixed temperature ($T_2 > T_1$):

in the case of $T \leq T_1$, a first voltage value is generated;

in the case of $T = T_2$, a second voltage value, which is smaller than the first one, is generated; and in the case of $T_2 < T < T_2$, the output voltage of the DC/DC converter gradually decreases.

11. The hybrid fuel cell system of claim 10 wherein the gate terminal of said DC/DC converter selects the more active control signal of a) said current limitation adjusting means and b) said voltage limitation adjusting means.

12. The hybrid fuel cell system of claim 1 further comprising a channel for supplying fuel gas to the fuel cell comprising a reforming device for reforming fuel gas into gas enriched with hydrogen and a fuel supply valve for controlling a quantity of fuel gas supplied to the reforming device, wherein an opening of the valve is set in response to an output current value of the fuel cell.

13. The hybrid fuel cell system of claim 12 further comprising:

a reforming device temperature detector for detecting a temperature of a catalytic layer of the reforming device; and a fuel supply valve opening correcting means for correcting the opening of said fuel supply valve responding to the result detected by the reforming device temperature detector, wherein fuel supply valve opening correcting means corrects the valve in a direction of opening when the temperature of the catalytic layer is higher than a standard temperature, and corrects in the valve in a direction of closing when the temperature of the catalytic layer is lower than the standard temperature, and holds the valve with a fixed opening when the temperature of the catalytic layer is the same as the standard temperature.

14. An operation method of a hybrid fuel cell system, the hybrid fuel cell system constructed to supply electric power to an external load including a series circuit of a fuel cell and current restricting means for restricting an output current of the fuel cell to which a storage cell is connected, comprising the steps of:

detecting a fluctuation in the current demanded by the external load; and changing the restriction of the output current of the fuel cell which is made by said current restricting means, with the passage of time.

* * * * *

UNITED STATES PATENT AND TRADEMARK OFFICE
CERTIFICATE OF CORRECTION

PATENT NO. : 5,334,463
DATED : August 2, 1994
INVENTOR(S) : Osamu TAJIMA et al.

It is certified that error appears in the above-indentified patent and that said Letters Patent is hereby corrected as shown below:

Column 1, line 29, after the word "leads" and before "a", please insert --to--.

Column 4, line 24, please delete "higher" and insert therefor --lower--.

Column 4, line 26, please delete "lower" and insert therefor --higher--.

Column 5, line 55, please delete "$1_{FR}$" and insert therefor --$I_{FR}$--.

Column 5, line 64, please delete "unit" and insert therefor --device--.

Column 6, line 37, please delete "positive" and insert therefor --negative--.

Column 6, line 38, please delete "negative" and insert therefor --positive--.

UNITED STATES PATENT AND TRADEMARK OFFICE
CERTIFICATE OF CORRECTION

PATENT NO. : 5,334,463
DATED : August 2, 1994
INVENTOR(S) : Osamu TAJIMA et al.

It is certified that error appears in the above-indentified patent and that said Letters Patent is hereby corrected as shown below:

Column 7, line 61, after the word "select" and before "more", please insert --the--.

Column 10, line 7, please delete the first occurrence of "$T_2$" and insert therefor --$T_1$--.

Column 10, line 34, please delete "higher" and insert therefor --lower--.

Column 10, line 37, please delete "lower" and insert therefor --higher--.

Signed and Sealed this

Fourth Day of July, 1995

Attest:

BRUCE LEHMAN

Attesting Officer

Commissioner of Patents and Trademarks